(12) United States Patent
Weyerhaeuser et al.

(10) Patent No.: US 9,037,570 B2
(45) Date of Patent: May 19, 2015

(54) OPTIMIZATION OF BUSINESS WAREHOUSE FILTERS ON COMPLEX CALCULATION MODELS

(71) Applicants: Christoph Weyerhaeuser, Heidelberg (DE); Tobias Mindnich, Walldorf (DE); Daniel Baeumges, Viersen (DE); Johannes Merx, Heidelberg (DE); Daniel Patejdl, Walldorf (DE)

(72) Inventors: Christoph Weyerhaeuser, Heidelberg (DE); Tobias Mindnich, Walldorf (DE); Daniel Baeumges, Viersen (DE); Johannes Merx, Heidelberg (DE); Daniel Patejdl, Walldorf (DE)

(73) Assignee: SAP SE, Walldorf (DE)

( * ) Notice: Subject to any disclaimer, the term of this patent is extended or adjusted under 35 U.S.C. 154(b) by 150 days.

(21) Appl. No.: 13/914,357

(22) Filed: Jun. 10, 2013

(65) Prior Publication Data
US 2014/0365465 A1    Dec. 11, 2014

(51) Int. Cl.
*G06F 17/30*    (2006.01)

(52) U.S. Cl.
CPC .................. *G06F 17/30699* (2013.01)

(58) Field of Classification Search
CPC ................ G06F 17/30699; G06F 17/30442
USPC .................................................. 707/714, 754
See application file for complete search history.

(56) References Cited

U.S. PATENT DOCUMENTS

| | | | |
|---|---|---|---|
| 4,811,257 A * | 3/1989 | Sumitani et al. | 708/131 |
| 6,341,281 B1 | 1/2002 | MacNicol et al. | |
| 6,484,162 B1 * | 11/2002 | Edlund et al. | 1/1 |
| 6,609,123 B1 | 8/2003 | Cazemier et al. | |
| 6,618,719 B1 * | 9/2003 | Andrei | 1/1 |
| 7,490,106 B2 | 2/2009 | Dumitru et al. | |
| 7,644,062 B2 | 1/2010 | Su et al. | |
| 7,769,776 B2 | 8/2010 | Tabraham | |
| 7,779,031 B2 | 8/2010 | Grosset et al. | |
| 8,195,643 B2 | 6/2012 | Weyerhaeuser et al. | |
| 8,224,807 B2 | 7/2012 | Lim et al. | |
| 8,229,966 B2 * | 7/2012 | Nolan | 707/797 |
| 2006/0212418 A1 * | 9/2006 | Dettinger et al. | 707/1 |
| 2006/0218123 A1 | 9/2006 | Chowdhuri et al. | |
| 2007/0043697 A1 | 2/2007 | Driesch et al. | |
| 2007/0168323 A1 | 7/2007 | Dickerman et al. | |
| 2007/0276785 A1 * | 11/2007 | Piedmonte | 707/2 |
| 2008/0172356 A1 * | 7/2008 | Bruno et al. | 707/2 |
| 2009/0070359 A1 * | 3/2009 | Nolan | 707/102 |
| 2009/0319499 A1 | 12/2009 | Meijer et al. | |
| 2010/0306188 A1 * | 12/2010 | Cunningham et al. | 707/713 |
| 2012/0005190 A1 * | 1/2012 | Faerber et al. | 707/718 |
| 2012/0109934 A1 * | 5/2012 | Weyerhaeuser et al. | 707/713 |

(Continued)

OTHER PUBLICATIONS

Fouché, Guy, et al., "Chapter 14: Introduction to Data Mining", Foundations of SQL Server 2008 R2 Business Intelligence, Apress, Berkeley, CA, © 2011, pp. 369-402.*

(Continued)

*Primary Examiner* — Robert Stevens
(74) *Attorney, Agent, or Firm* — Mintz Levin Cohn Ferris Glovsky and Popeo, P.C.

(57) ABSTRACT

A query associated with a calculation scenario comprising a plurality of calculation nodes can be received by a calculation engine. The calculation scenario is instantiated and the query is transformed into a convex hull filter based on the at least one multiple selection condition that can be executed at any of the calculation nodes. The instantiated calculation scenario and the convex hull filter are executed to provide a result set. Related apparatus, systems, methods, and articles are also described.

54 Claims, 3 Drawing Sheets

(56) References Cited

U.S. PATENT DOCUMENTS

2012/0130942 A1 5/2012 Dipper et al.
2012/0254178 A1 10/2012 Murthy

OTHER PUBLICATIONS

Bizarro, Pedro, et al., "Adding a Performance-Oriented Perspective to Data Warehouse Design", DaWaK 2002, LNCS 2454, Springer-Verlag, Berlin, Germany, © 2002, pp. 232-244.*

Martínez-Medina, Lourdes Angélica, et al., "Query optimization using case-based reasoning in ubiquitous environments", ENC 2009, Mexico City, Sep. 21-25, 2009, pp. 107-118.*

Knorr, Edwin M., et al., "Finding Aggregate Proximity Relationships and Commonalities in Spatial Data Mining", IEEE Transactions on Knowledge and Data Engineering, vol. 8, No. 6, Dec. 1996, pp. 884-897.*

Bizarro, Pedro, et al., "Progressive Parametric Query Optimization", IEEE Transactions on Knowledge and Data Engineering, vol. 21, No. 4, Apr. 2009, pp. 582-594.*

Langit, Lynn, "Chapter 11: Introduction to Data Mining", Foundations of SQL Server 2005 Business Intelligence, Apress, Berkeley, CA, © 2007, pp. 243-276.*

* cited by examiner

OPTIMIZATION OF BUSINESS WAREHOUSE FILTERS ON COMPLEX CALCULATION MODELS

TECHNICAL FIELD

The subject matter described herein relates to the optimization of business warehouse filters on complex calculation models that can be executed by a calculation engine.

BACKGROUND

Data flow between an application server and a database server is largely dependent on the scope and number of queries generated by the application server. Complex calculations can involve numerous queries of the database server which in turn can consume significant resources in connection with data transport as well as application server-side processing of transported data. With some database platforms, multiple filters specified by a query can be pushed down and the results returned in a single table. However, depending on the particular implementation, such multiple filters can unnecessarily consume processing resources, and in some cases, result in delayed response time.

SUMMARY

In one aspect, a query is received by a database server from a remote application server. The query is associated with a calculation scenario that in turn scenario defines a data flow model that includes one or more calculation nodes. Each calculation node defines one or more operations to execute on the database server and the query defines at least one multiple selection condition filter. The database server then instantiates the calculation scenario. In addition, the database server transforms the query to further comprise a convex hull filter based on the at least one multiple selection condition that can be executed at any of the calculation nodes. The database server then executes the operations defined by the calculation nodes of the instantiated calculation scenario and the transformed query to result in a responsive data set. The data set is then provided by the database server to the application server.

The calculation scenarios can be modified during runtime (and as such the instantiated calculation scenario is the modified calculation scenario). The at least one multiple selection condition filter forms part of a selection for formula element (FEMS) filter. The convex hull can be computed by generating a global filter comprising each part of the multiple selection condition and connecting each part by an OR operation. The convex hull can be on a child calculation node of a calculation node comprising the multiple selection condition filter.

At least a portion of paths and/or attributes defined by the calculation scenario can be not required to respond to the query. In such cases, the instantiated calculation scenario can omit the paths and attributes defined by the calculation scenario that are not required to respond to the query.

At least one of the calculation nodes can filter results obtained from the database server. At least one of the calculation nodes can sort results obtained from the database server.

The calculation scenario can be instantiated in a calculation engine layer by a calculation engine. The calculation engine layer can interact with a physical table pool and a logical layer. The physical table pool can include physical tables containing data to be queried and the logical layer can define a logical metamodel joining at least a portion of the physical tables in the physical table pool.

An input for each calculation node can include one or more of: a physical index, a join index, an OLAP index, and another calculation node. Each calculation node can have at least one output table that is used to generate the final result set. At least one least one calculation node can consume an output table of another calculation node.

The query can be forwarded to a calculation node in the calculation scenario that is identified as a default node if the query does not specify a calculation node at which the query should be executed. In other cases, the query identifies a particular calculation node such that the query is executed by forwarding the query to the calculation node specified in the query at which the query should be executed.

The calculation scenario can include database metadata. The calculation scenario can be exposed as a database calculation view.

A SQL processor can invoke a calculation engine to execute the calculation scenario behind the database calculation view. The calculation can invoke the SQL processor for executing set operations. The SQL processor can invoke the calculation engine when executing SQL queries with calculation views.

Computer program products are also described that comprise non-transitory computer readable media storing instructions, which when executed one or more data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter is advantageous in that it allows for common parts of multiple selection conditions (e.g., FEMS filters) to be pushed down while maintaining a specific part of the multiple selection conditions as post filter on a top aggregation-operation. Such an arrangement improves execution time tremendously and can also reduce the amount of memory consumed by queries.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
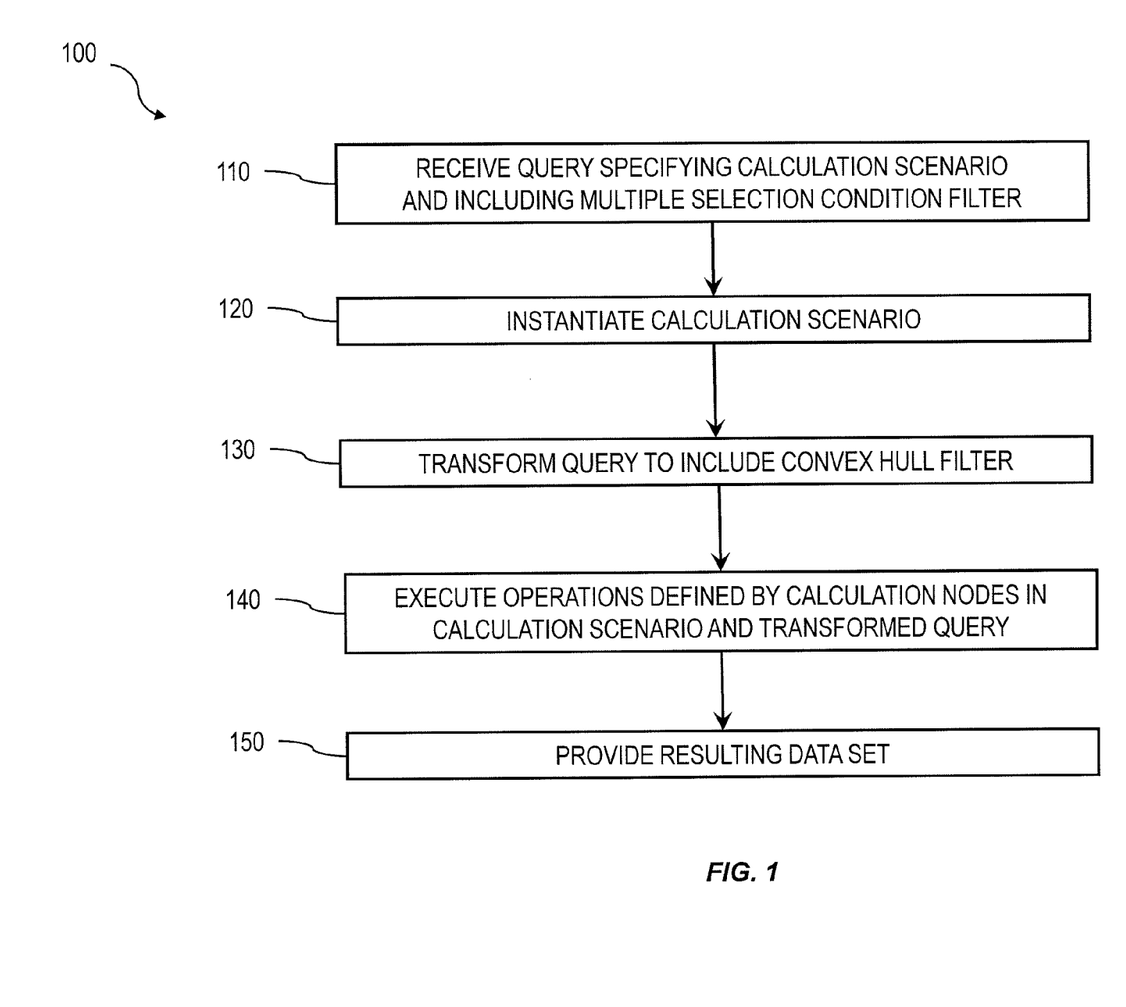
FIG. 1 is a process flow diagram illustrating a method of optimizing a query having multiple selection conditions.

With reference to diagram 100 of FIG. 1, at 110, a query is received by a database server from a remote application server. The query is associated with a calculation scenario that defines a data flow model that includes one or more calculation nodes. Each calculation node defines one or more operations to execute on the database server. In addition, the query defines at least one multiple selection condition filter. The calculation scenario is then, at 120, instantiated. Thereafter, at 130, the database server transforms the query to further comprise a convex hull filter (i.e., multiple selection condition, etc.) that can be executed at any of the calculation nodes. Subsequently, at 140, the operations defined by the calculation nodes of the instantiated calculation scenario can be executed to result in a responsive data set. The database server then, at 150, provides the data set to the application server.

The subject matter described herein can enable an application developer to define a data flow model to push down a high level algorithm to a database. A developer can define a calculation scenario which describes this algorithm in a general way as data flow consisting of calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

During query time (i.e., the time in which a database is queried), the data flow specified by a calculation scenario is instantiated. During instantiation, the calculation scenario is compacted to only include queries requirements by removing useless pathes and attributes (that are not requested) within the calculation scenario. This compaction reduces calculation time and also minimizes the total amount of data that must be processed.

Figure 2:
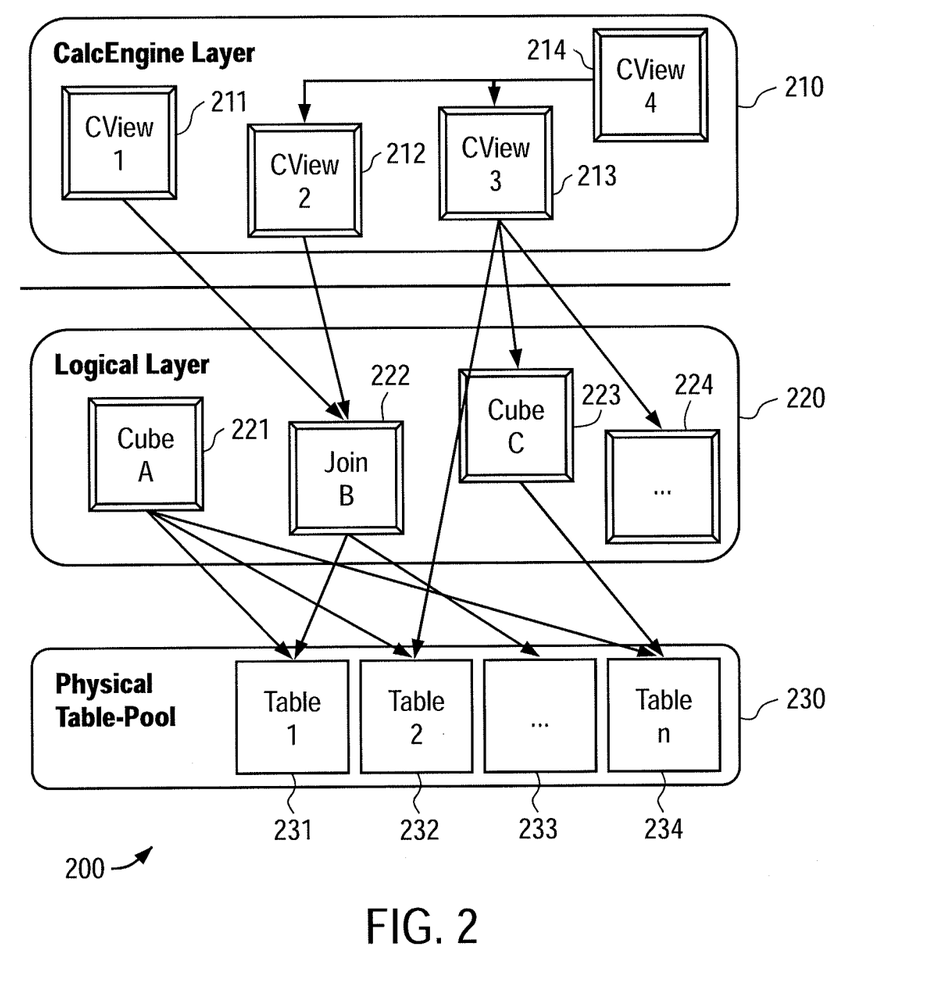
FIG. 2 is a diagram illustrating a calculation engine layer, a logical layer, a physical table pool and their interrelationship.

FIG. 2 is a diagram 200 that illustrates a database system in which there are three layers, a calculation engine layer 210, a logical layer 220, and a physical table-pool 230. Calculation scenarios can be executed by a calculation engine which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of physical tables (called indexes) containing the data. Various tables can then be joined using logical metamodels defined by the logical layer 220 to form a new index. For example, the tables in a cube (OLAP view) can be assigned roles (e.g., fact or dimension tables) and joined to form a star schema. It is also possible to form join indexes, which can act like database view in environments such as the Fast Search Infrastructure (FSI) by SAP AG.

As stated above, calculation scenarios can include individual calculation nodes 211-214, which in turn each define operations such as joining various physical or logical indexes and other calculation nodes (e.g., CView 4 is a join of CView 2 and CView 3). That is, the input for a calculation node 211-214 can be one or more physical, join, or OLAP views or calculation nodes.

In calculation scenarios, two different representations can be provided. First, a pure calculation scenario in which all possible attributes are given. Second, an instantiated model that contains only the attributes requested in the query (and required for further calculations). Thus, calculation scenarios can be created that can be used for various queries. With such an arrangement, calculation scenarios can be created which can be reused by multiple queries even if such queries do not require every attribute specified by the calculation scenario.

Every calculation scenario can be uniquely identifiable by a name (i.e., the calculation scenario can be a database object with a unique identifier, etc.). This means, that the calculation scenario can be queried in a manner similar to a view in a SQL database. Thus, the query is forwarded to the calculation node 211-214 for the calculation scenario that is marked as the corresponding default node. In addition, a query can be executed on a particular calculation node 211-214 (as specified in the query). Furthermore, nested calculation scenarios can be generated in which one calculation scenario is used as source in another calculation scenario (via a calculation node 211-214 in this calculation scenario). Each calculation node 211-214 can have one or more output tables. One output table can be consumed by several calculation nodes 211-214.

Further details regarding calculation engine architecture and calculation scenarios can be found in U.S. Pat. No. 8,195,643, the contents of which are hereby fully incorporated by reference.

Figure 3:
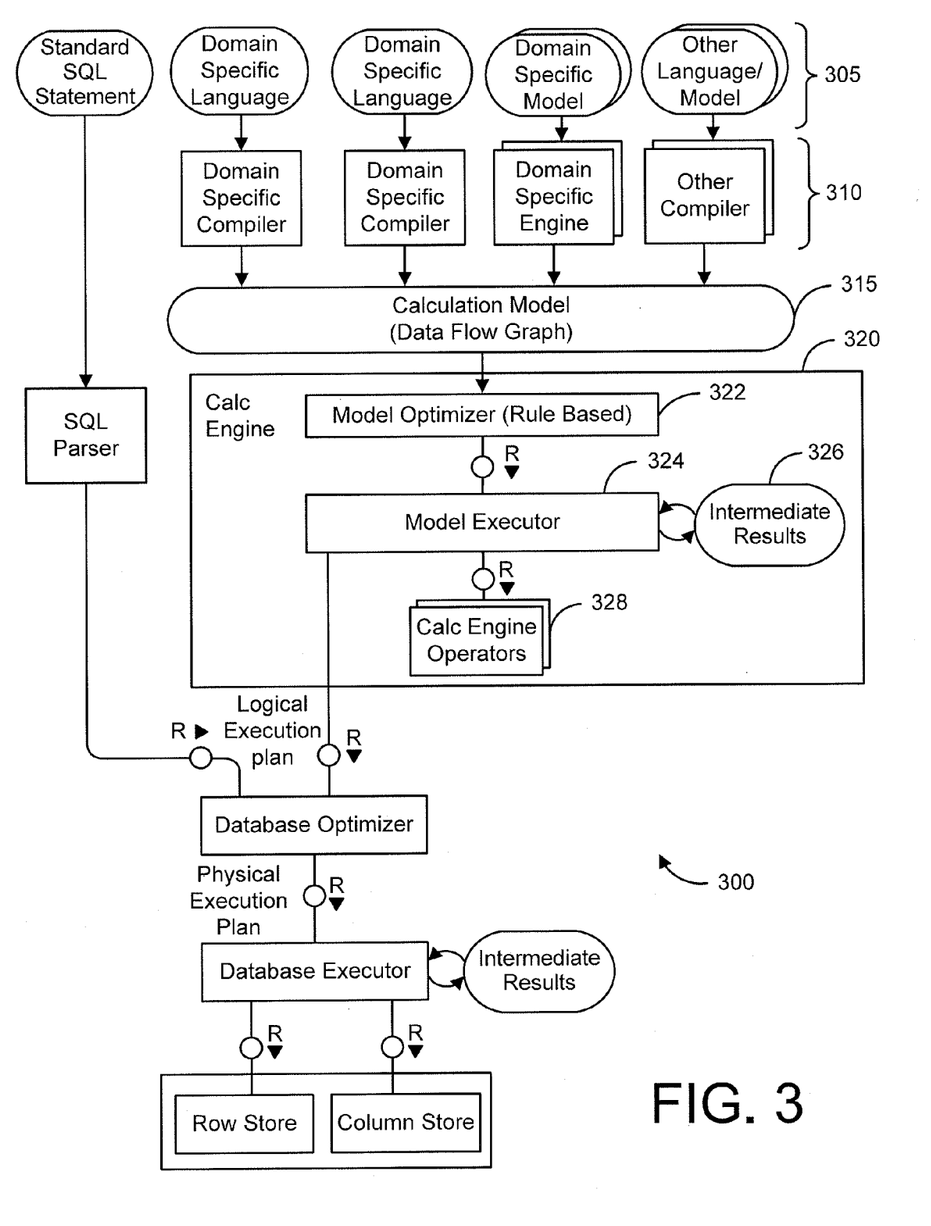
FIG. 3 is a diagram illustrating an architecture for processing and execution control.

FIG. 3 is a diagram 300 illustrating a sample architecture for request processing and execution control. As shown in FIG. 3, artifacts 305 in different domain specific languages can be translated by their specific compilers 310 into a common representation called a "calculation scenario" 315 (illustrated as a calculation model). To achieve enhanced performance, the models and programs written in these languages are executed inside the database server. This arrangement eliminates the need to transfer large amounts of data between the database server and the client application. Once the different artifacts 305 are compiled into this calculation scenario 315, they can be processed and executed in the same manner. The execution of the calculation scenarios 315 is the task of a calculation engine 320.

The calculation scenario 315 can be a directed acyclic graph with arrows representing data flows and nodes that represent operations. Each calculation node has a set of inputs and outputs and an operation that transforms the inputs into the outputs. In addition to their primary operation, each calculation node can also have a filter condition for filtering the result set. The inputs and the outputs of the operations can be table valued parameters (i.e., user-defined table types that are passed into a procedure or function and provide an efficient way to pass multiple rows of data to the application server). Inputs can be connected to tables or to the outputs of other calculation nodes. Calculation scenarios 315 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 315 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result he or she can use a split. Then, the nodes can be automatically multiplied between split and merge and partition the data.

A calculation scenario 315 can be defined as part of database metadata and invoked multiple times. A calculation scenario 315 can be created, for example, by a SQL statement "CREATE CALCULATION SCENARIO <NAME> USING <XML or JSON>". Once a calculation scenario 315 is created, it can be queried (e.g., "SELECT A, B, C FROM <scenario name>", etc.). In some cases, databases can have pre-defined calculation scenarios 315 (default, previously defined by users, etc.). The calculation scenarios 315 can be persisted in a repository (coupled to the database server) or in transient scenarios, the calculation scenarios 315 can be kept in-memory.

Calculation scenarios 315 are more powerful than traditional SQL queries or SQL views for many reasons. One reason is the possibility to define parameterized calculation schemas that are specialized when the actual query is issued. Unlike a SQL view, a calculation scenario 315 does not describe the actual query to be executed. Rather, it describes the structure of the calculation. Further information is supplied when the calculation scenario is executed. This further information can include parameters that represent values (for example in filter conditions). To obtain more flexibility, it is also possible to refine the operations when the model is invoked. For example, at definition time, the calculation scenario 315 may contain an aggregation node containing all attributes. Later, the attributes for grouping can be supplied with the query. This allows having a predefined generic aggregation, with the actual aggregation dimensions supplied at invocation time. The calculation engine 320 can use the actual parameters, attribute list, grouping attributes, and the like supplied with the invocation to instantiate a query specific calculation scenario 315. This instantiated calculation scenario 315 is optimized for the actual query and does not contain attributes, nodes or data flows that are not needed for the specific invocation.

When the calculation engine 320 gets a request to execute a calculation scenario 315, it can first optimize the calculation scenario 315 using a rule based model optimizer 322. Examples for optimizations performed by the model optimizer can include "pushing down" filters and projections so that intermediate results 326 are narrowed down earlier, or the combination of multiple aggregation and join operations into one node. The optimized model can then be executed by a calculation engine model executor 324 (a similar or the same model executor can be used by the database directly in some cases). This includes decisions about parallel execution of operations in the calculation scenario 315. The model executor 324 can invoke the required operators (using, for example, a calculation engine operators module 328) and manage intermediate results. Most of the operators are executed directly in the calculation engine 320 (e.g., creating the union of several intermediate results). The remaining nodes of the calculation scenario 315 (not implemented in the calculation engine 320) can be transformed by the model executor 324 into a set of logical database execution plans. Multiple set operation nodes can be combined into one logical database execution plan if possible.

The calculation scenarios 315 of the calculation engine 320 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 320 to execute the calculation scenario 315 behind the calculation view. In some implementations, the calculation engine 320 and the SQL processor are calling each other: on one hand the calculation engine 320 invokes the SQL processor for executing set operations and SQL nodes and, on the other hand, the SQL processor invokes the calculation engine 320 when executing SQL queries with calculation views.

The attributes of the incoming datasets utilized by the rules of model optimizer 322 can additionally or alternatively be based on an estimated and/or actual amount of memory consumed by the dataset, a number of rows and/or columns in the dataset, and the number of cell values for the dataset, and the like.

Many business warehouse (BW) queries can push multiple filters into a query to the database (for execution by the calculation engine 320). As used herein, pushing down multiple filters to the database (e.g., SAP HANA platform) is referred to a selection for formula element (FEMS) filters (also sometimes referred to as Formel Element Selection Filters). FEMS filters are also described herein as having multiple selection conditions. FEMS filters can improve performance of query-processing because an OLAP engine can do a single aggregation and single scan on the fact table while applying different filter conditions. Hence, one can execute multiple queries at once and return multiple results in one table that can be naturally processed by the OLAP processor in a business warehouse.

The calculation engine 320 can support such queries as well because otherwise the business warehouse (BW) queries will not run on calculation views. Without the optimizations provided herein, the calculation engine 320 will put the FEMS filter at the top most aggregation (i.e., calculation node providing an aggregation) without optimization. Such an arrangement works well in case of queries on calculation models with multiprovider-operations because the calculation engine 320 can push the aggregation into the multiprovider-operation. Then, the FEMS filters are evaluated as early as possible in the OLAP engine. But as the usage of composite providers becomes more popular in business warehouse applications (see for example, U.S. patent application Ser. No. 13/914,214, the contents of which are hereby fully incorporated by reference), this manner of executing queries it is not sufficiently efficient because, if the operations below the top aggregation are not multiproviders, the calculation engine 320 cannot optimize it further. The reason for this is that FEMS filters are only supported by OLAP engine. Hence the calculation engine optimizer 322 has to ensure that the FEMS filter is only pushed down to a calculation node providing an aggregation-operation. This can be difficult because a filter cannot always be pushed down (e.g., through a cascade of join-operations to finally be applied on an aggregation-operation, etc.). The main issue of not optimizing such FEMS filter on composite providers is that the intermediate results can be very large and the execution time of the data source (e.g. OLAP views) can be very long or can even abort due to out of memory situations.

In order to obviate some of the issues described above, the current subject matter enables pushing down common parts of FEMS filters while maintaining the FEMS specific part as post filter on the top aggregation-operation (i.e., a convex hull as describe herein, etc.).

Example FEMS filters (e.g., multiple selection conditions) of business warehouse queries can look like the following (written in Postfix format). In this example, a query request attributes A, B, C, and D with the following FEMS filters:
FEMS 0: A=10
FEMS 1: B=10
FEMS 1: B=20
FEMS 1: AND
FEMS 2: C=30
FEMS 3: D=40

In this example the query has three independent filters and one global filter (FEMS 0 is always the global filter). Stated differently, the FEMS query (i.e., the query with FEMS filters) can be read as three individual queries with a common filter A=10. If the filters are executed in independent queries it would look like the following:

Query 1. SELECT A, B, C, D FROM CalcScenario WHERE B=10 OR B=20 AND A=10
Query 2. SELECT A, B, C, D FROM CalcScenario WHERE C=30 AND A=10
Query 3. SELECT A, B, C, D FROM CalcScenario WHERE D=40 AND A=10

Each of the three queries would produce a result table with the following structure (but with different content except for column A which is the common filter):

| A | B | C | D |
|---|---|---|---|
| 10 | ... | ... | ... |
| 10 | ... | ... | ... |

With FEMS queries, all three queries are combined to one query with one result table. The result table has an additional FEMS column to indicate which result row belongs to which query:

| FEMS | A | B | C | D |
|------|---|---|---|---|
| 1 | 10 | ... | ... | ... |
| 1 | 10 | ... | ... | ... |
| 2 | 10 | ... | ... | ... |
| ... | ... | ... | ... | ... |
| 3 | 10 | ... | ... | ... |

As the FEMS filters (specified by queries) cannot be reliably be pushed down to a calculation node providing an aggregation-operation, the FEMs filter can be transformed into a general filter that can be processed, by the calculation engine 320, at any calculation node. The general filter will not be as selective as the FEMS filter but this is also not necessary because the FEMS filters will still be applied on the topmost calculation node providing an aggregation-operation as post filter. Hence, the calculation engine 320 can create a new filter on the child calculation node of the calculation node that contains the operation required for the FEMS filter. This new filter can comprise the convex hull of the FEMS filter. The new filter for the example above will look like the following:
General Filter:
B=10
B=20
AND
C=30
OR
D=40
OR
A=10
AND For computation of the convex hull, one can take every part of the FEMS filter (e.g. all filters with FEMS 1, all filters with FEMS 2, etc.) and put each part in to a global filter and connect all FEMS filter parts with an OR-Operator. In some cases, such as corner cases, it may not make sense to push down the FEMS filter. For example, if one filter-entry matches basically all rows (e.g. a like predicate as '*'). Such filter-entries can be detected and the filter push down can be bypassed.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
   receiving, by a database server from a remote application server, a query associated with a calculation scenario, the calculation scenario defining a data flow model that includes one or more calculation nodes, each calculation node defining one or more operations to execute on the database server, the query defining at least one multiple selection condition filter;
   instantiating, by the database server, the calculation scenario;
   transforming, by the database server, the query to further comprise a convex hull filter based on the at least one multiple selection condition that can be executed at any of the calculation nodes;
   executing, by the database server, the operations defined by the calculation nodes of the instantiated calculation scenario and the transformed query to result in a responsive data set; and
   providing, by the database server to the application server, the data set.

2. A method as in claim 1, further comprising:
   modifying, during runtime, the calculation scenario based on the transformed query;
   wherein the instantiated calculation scenario is the modified calculation scenario.

3. A method as in claim 1, wherein the at least one multiple selection condition filter forms part of a selection for formula element (FEMS) filter.

4. A method as in claim 1, further comprising:
   computing the convex hull by generating a global filter comprising each part of the multiple selection condition and connecting each part by an OR operation.

5. A method as in claim 1, wherein the convex hull is on a child calculation node of a calculation node comprising the multiple selection condition filter.

6. A method as in claim 1, wherein at least a portion of paths and/or attributes defined by the calculation scenario are not required to respond to the query, and wherein the instantiated calculation scenario omits the paths and attributes defined by the calculation scenario that are not required to respond to the query.

7. A method as in claim 1, wherein at least one of the calculation nodes filters results obtained from the database server.

8. A method as in claim 1, wherein at least one of the calculation nodes sorts results obtained from the database server.

9. A method as in claim 1, wherein the calculation scenario is instantiated in a calculation engine layer by a calculation engine.

10. A method as in claim 9, wherein the calculation engine layer interacts with a physical table pool and a logical layer, the physical table pool comprising physical tables containing data to be queried, and the logical layer defining a logical metamodel joining at least a portion of the physical tables in the physical table pool.

11. A method as in claim 1, wherein an input for each calculation node comprises one or more of: a physical index, a join index, an OLAP index, and another calculation node.

12. A method as in claim 11, wherein each calculation node has at least one output table that is used to generate the final result set.

13. A method as in claim 12, wherein at least one calculation node consumes an output table of another calculation node.

14. A method as in claim 1, wherein the executing comprises:
    forwarding the query to a calculation node in the calculation scenario that is identified as a default node if the query does not specify a calculation node at which the query should be executed.

15. A method as in claim 1, wherein the query identifies a particular calculation node, and wherein the executing comprises:
    forwarding the query to the calculation node specified in the query at which the query should be executed.

16. A method as in claim 1, wherein the calculation scenario comprises database metadata.

17. A method as in claim 1, wherein the calculation scenario is exposed as a database calculation view.

18. A method as in claim 17, wherein the executing comprises:
    invoking, by a SQL processor, a calculation engine to execute the calculation scenario behind the database calculation view;
    wherein the calculation engine invokes the SQL processor for executing set operations; and
    wherein the SQL processor invokes the calculation engine when executing SQL queries with calculation views.

19. A system comprising:
    a database server comprising memory and at least one data processor;
    an application server in communication with and remote from the database server comprising memory and at least one data processor;
    wherein the database server:
    receives a query from the application server that is associated with a calculation scenario, the calculation scenario defining a data flow model that includes one or more calculation nodes, each calculation node defining one or more operations to execute on the database server, the query defining at least one multiple selection condition filter;
    instantiates the calculation scenario;

transforms the query to further comprise a convex hull filter based on the at least one multiple selection condition that can be executed at any of the calculation nodes;

executes the operations defined by the calculation nodes of the instantiated calculation scenario and the transformed query to result in a responsive data set; and provides the data set to the application server.

20. A system as in claim 19, wherein an input for each calculation node comprises one or more of: a physical index, a join index, an OLAP index, and another calculation node.

21. A system as in claim 20, wherein each calculation node has at least one output table that is used to generate the final result set.

22. A system as in claim 21, wherein at least one calculation node consumes an output table of another calculation node.

23. A system as in claim 19, wherein the executing comprises:

forwarding the query to a calculation node in the calculation scenario that is identified as a default node if the query does not specify a calculation node at which the query should be executed.

24. A system as in claim 19, wherein the query identifies a particular calculation node, and wherein the executing comprises:

forwarding the query to the calculation node specified in the query at which the query should be executed.

25. A system as in claim 19, wherein the calculation scenario comprises database metadata.

26. A system as in claim 19, wherein the calculation scenario is exposed as a database calculation view.

27. A system as in claim 26, wherein the executing comprises:

invoking, by a SQL processor, a calculation engine to execute the calculation scenario behind the database calculation view;

wherein the calculation engine invokes the SQL processor for executing set operations; and wherein the SQL processor invokes the calculation engine when executing SQL queries with calculation views.

28. A non-transitory computer program product storing instructions, which when executed by at least one data processor, result in operations comprising:

receiving, by a database server from a remote application server, a query associated with a calculation scenario, the calculation scenario defining a data flow model that includes one or more calculation nodes, each calculation node defining one or more operations to execute on the database server, the query defining at least one multiple selection condition filter;

instantiating, by the database server, the calculation scenario;

transforming the query to further comprise a convex hull filter based on the at least one multiple selection condition that can be executed at any of the calculation nodes;

executing, by the database server, the operations defined by the calculation nodes of the instantiated calculation scenario and the transformed query to result in a responsive data set; and providing, by the database server to the application server, the data set.

29. A system as in claim 19, wherein the operations further comprise:

modifying, during runtime, the calculation scenario based on the transformed query;

wherein the instantiated calculation scenario is the modified calculation scenario.

30. A system as in claim 19, wherein the at least one multiple selection condition filter forms part of a selection for formula element (FEMS) filter.

31. A system as in claim 19, wherein the operations further comprise:

computing the convex hull by generating a global filter comprising each part of the multiple selection condition and connecting each part by an OR operation.

32. A system as in claim 19, wherein the convex hull is on a child calculation node of a calculation node comprising the multiple selection condition filter.

33. A system as in claim 19, wherein at least a portion of paths and/or attributes defined by the calculation scenario are not required to respond to the query, and wherein the instantiated calculation scenario omits the paths and attributes defined by the calculation scenario that are not required to respond to the query.

34. A system as in claim 19, wherein at least one of the calculation nodes filters results obtained from the database server.

35. A system as in claim 19, wherein at least one of the calculation nodes sorts results obtained from the database server.

36. A system as in claim 19, wherein the calculation scenario is instantiated in a calculation engine layer by a calculation engine.

37. A system as in claim 36, wherein the calculation engine layer interacts with a physical table pool and a logical layer, the physical table pool comprising physical tables containing data to be queried, and the logical layer defining a logical metamodel joining at least a portion of the physical tables in the physical table pool.

38. A computer program product as in claim 28, wherein the operations further comprise:

modifying, during runtime, the calculation scenario based on the transformed query;

wherein the instantiated calculation scenario is the modified calculation scenario.

39. A computer program product as in claim 28, wherein the at least one multiple selection condition filter forms part of a selection for formula element (FEMS) filter.

40. A computer program product as in claim 28, wherein the operations further comprise:

computing the convex hull by generating a global filter comprising each part of the multiple selection condition and connecting each part by an OR operation.

41. A computer program product as in claim 28, wherein the convex hull is on a child calculation node of a calculation node comprising the multiple selection condition filter.

42. A computer program product as in claim 28, wherein at least a portion of paths and/or attributes defined by the calculation scenario are not required to respond to the query, and wherein the instantiated calculation scenario omits the paths and attributes defined by the calculation scenario that are not required to respond to the query.

43. A computer program product as in claim 28, wherein at least one of the calculation nodes filters results obtained from the database server.

44. A computer program product as in claim 28, wherein at least one of the calculation nodes sorts results obtained from the database server.

45. A computer program product as in claim 28, wherein the calculation scenario is instantiated in a calculation engine layer by a calculation engine.

46. A computer program product as in claim 45, wherein the calculation engine layer interacts with a physical table pool and a logical layer, the physical table pool comprising physical tables containing data to be queried, and the logical layer defining a logical metamodel joining at least a portion of the physical tables in the physical table pool.

47. A computer program product as in claim 28, wherein an input for each calculation node comprises one or more of: a physical index, a join index, an OLAP index, and another calculation node.

48. A computer program product as in claim 47, wherein each calculation node has at least one output table that is used to generate the final result set.

49. A computer program product as in claim 48, wherein at least one calculation node consumes an output table of another calculation node.

50. A computer program product as in claim 28, wherein the executing comprises:
   forwarding the query to a calculation node in the calculation scenario that is identified as a default node if the query does not specify a calculation node at which the query should be executed.

51. A computer program product as in claim 28, wherein the query identifies a particular calculation node, and wherein the executing comprises:
   forwarding the query to the calculation node specified in the query at which the query should be executed.

52. A computer program product as in claim 28, wherein the calculation scenario comprises database metadata.

53. A computer program product as in claim 28, wherein the calculation scenario is exposed as a database calculation view.

54. A computer program product as in claim 53, wherein the executing comprises:
   invoking, by a SQL processor, a calculation engine to execute the calculation scenario behind the database calculation view;
   wherein the calculation engine invokes the SQL processor for executing set operations; and
   wherein the SQL processor invokes the calculation engine when executing SQL queries with calculation views.

\* \* \* \* \*